(12) United States Patent
Molnar et al.

(10) Patent No.: US 8,711,769 B2
(45) Date of Patent: Apr. 29, 2014

(54) INTERFERER REGION IDENTIFICATION USING IMAGE PROCESSING

(75) Inventors: Karl Molnar, Cary, NC (US); Gregory E. Bottomley, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 986 days.

(21) Appl. No.: 12/504,233

(22) Filed: Jul. 16, 2009

(65) Prior Publication Data

US 2011/0013556 A1     Jan. 20, 2011

(51) Int. Cl.
*H04W 4/00*      (2009.01)

(52) U.S. Cl.
USPC .......................................... 370/328; 370/346

(58) Field of Classification Search
CPC ..................................... H04J 11/0023
See application file for complete search history.

(56) References Cited

U.S. PATENT DOCUMENTS

| | | | | |
|---|---|---|---|---|
| 6,671,340 | B1 * | 12/2003 | Kroeger et al. | 375/350 |
| 2002/0119781 | A1 * | 8/2002 | Li et al. | 455/450 |
| 2006/0165176 | A1 * | 7/2006 | Raveendran et al. | 375/240.16 |
| 2006/0250939 | A1 * | 11/2006 | Wang et al. | 370/208 |
| 2006/0252436 | A1 * | 11/2006 | Tirkkonen et al. | 455/501 |
| 2007/0087694 | A1 * | 4/2007 | Jin et al. | 455/63.1 |

FOREIGN PATENT DOCUMENTS

WO    WO2008/060203 A1 *    5/2008    ............. H04B 7/04

* cited by examiner

*Primary Examiner* — Jae Y Lee

(57) ABSTRACT

Demodulation and interference parameter estimation in an OFDM receiver is improved by identifying regions, in a two-dimensional array of time-frequency transmission positions, having related interference parameters, such as resulting from the same pre-coding scheme, transmission rank, transmitting antennas, and the like. An interference measure is estimated for each of a plurality of time-frequency positions. The interference measures are analyzed by considering them as pixels, or picture elements, in a two-dimensional image, and applying image processing algorithms to identify the regions having related interference parameters. The image processing algorithms may include operations such as edge detection, segmentation, and/or clustering. The receiver may perform interference suppression or cancellation such as interference rejection combining of data extracted from signals received within an identified time-frequency region having related interference parameters.

16 Claims, 4 Drawing Sheets

INTERFERER REGION IDENTIFICATION USING IMAGE PROCESSING

TECHNICAL FIELD

The present invention relates generally to wireless communication, and in particular to a system and method of estimating interference in an OFDM receiver using image processing operations.

BACKGROUND

Interference and noise are major factors limiting the performance of cellular wireless communication networks. Most modern mobile terminals, or User Equipment (UE) include some demodulation capability to mitigate interference, thus improving the signal to interference plus noise ratio (SINR) measured at the output of the receiver. Improvements in SINR result in better performance. This capability can be used, for example, in detecting transmitted data information or in computing some measure of channel quality information (CQI) that is used for link adaptation, power control and user scheduling. The same is true of base stations.

Canceling or suppressing interference typically relies on identification of a set of channel resources that experience a particular form of interference as well as the estimation of interferer parameters for that set. The process of identification estimates the presence of an interference source that affects multiple channel resources. The process of interference parameter estimation is more easily accomplished when the interferer does not vary significantly in time or frequency due to fading, dispersion or intermittent transmission of the interferer. Since the estimation process typically is performed in the presence of random (i.e., thermal) noise, a sufficient number of estimation samples are required to minimize the effects of the noise. Further, estimation degrades when those samples are used where the interference varies abruptly.

Orthogonal frequency-division multiplexing (OFDM) is a spread spectrum multiplexing technique that distributes transmitted data over a large number of sub-carriers that are spaced apart at precise frequencies. Data is divided into a plurality of parallel data streams, one for each sub-carrier. Each sub-carrier is modulated at a low symbol rate, maintaining total data rates similar to conventional, single-carrier modulation schemes in the same bandwidth. Additionally, pre-coding may be applied across the transmitted symbols prior to mapping to the OFDM sub-carriers, for example, to obtain transmit diversity or to obtain better peak to average power in the transmitted signal.

In OFDM systems such as the Long Term Evolution (LTE) of the Universal Mobile Telecommunications System (UMTS), discontinuities can exist in the interference due to a number of reasons: 1) interferer signals transmitted from other cells can be packet-based, so interferer transmissions may be intermittent; 2) in addition to scheduling in time, transmissions can be scheduled in different frequency sub-bands; 3) multiple users can exist, for example from multiple base stations in the downlink and from multiple users in the uplink; 4) different transmission ranks can be used which present different interferer profiles; and 5) different pre-coding schemes can be used, which also present different interferer profiles. Similar situations exist in other OFDM systems, such as WiMAX.

For LTE, since scheduling is performed on contiguous groups of OFDM sub-carriers and symbols, called resource blocks, one approach to mitigating the impact of interference discontinuities is to restrict the estimation of the interferer parameters to use only received data corresponding to a single resource block. This avoids the problem of having to use an adjacent resource block, which may contain a different interferer profile. However, this potentially limits the estimation accuracy in the case where the same interferer profile exists in one or more adjacent resource blocks, and could be used to improve interference estimation.

SUMMARY

According to one or more embodiments disclosed and claimed herein, demodulation and interference parameter estimation in an OFDM system is improved by identifying regions, in a two-dimensional array of time-frequency transmission positions, having related interference parameters, such as resulting from the same pre-coding scheme, transmission rank, transmitting antennas, and the like. An interference measure is estimated for each of a plurality of time-frequency positions. The interference measures are analyzed by considering them as pixels, or picture elements, in a two-dimensional image, and applying image processing algorithms to identify the regions having related interference parameters. The image processing algorithms may include operations such as edge detection, segmentation, and/or clustering.

One embodiment relates to a method of estimating common interference presence in an OFDM wireless communication system. Signals are received from a wireless communication network at a plurality of time-frequency positions. An interference measure for signals received at two or more time-frequency positions is estimated. The interference measures are processed as pixels in a two-dimensional image to identify at least one region having related interference parameters. Interference parameter estimation is performed over the identified time-frequency region and used in the demodulation process.

Other embodiments relate to User Equipment (UE) and base stations operative to receive OFDM signals at a plurality of time-frequency positions. The UE includes one or more antennas and a receiver circuit connected to the antennas and operative to process received signals. The UE or base station also includes an interference presence estimator operative to estimate an interference measure for signals received at two or more time-frequency positions. The UE additionally includes an image processor operative to perform image processing operations on the interference measures to identify at least one region having related interference parameters. The interference estimator is further operative to perform interference parameter estimation over the identified time-frequency region.

DETAILED DESCRIPTION

Figure 1:
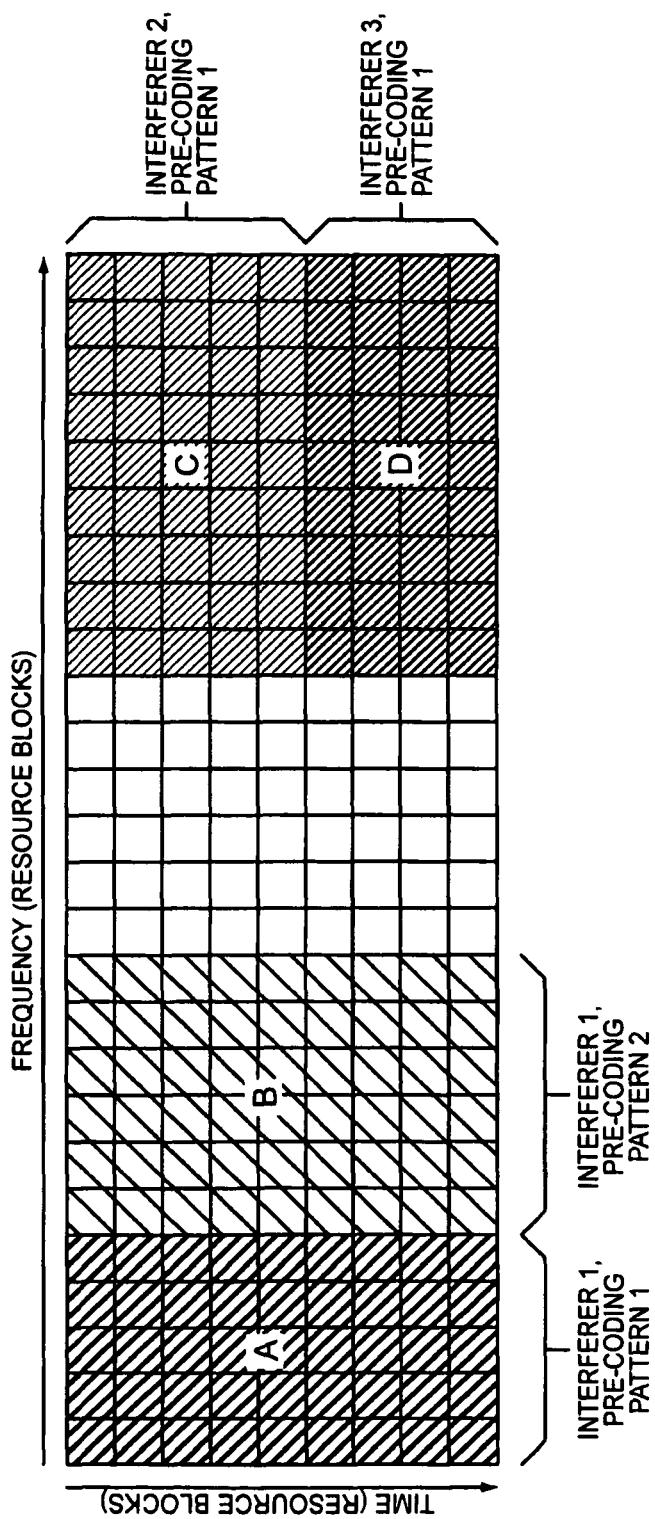
FIG. 1 is a time-frequency diagram of various interfering OFDM downlink transmissions.

FIG. 1 depicts a representative time-frequency grid of OFDM downlink transmission resource blocks. Each block in FIG. 1 represents a resource block—that is, a predefined number of sub-carriers and transmitted symbol positions. FIG. 1 depicts transmissions from three interference sources, each spanning a plurality of resource blocks. The first interference source, denoted as Interferer 1, comprises two different regions, denoted A and B. Different pre-coding schemes are used in regions A and B, and there exists a discontinuity, aligned along the frequency axis, in the time-frequency "area" of interference from Interferer 1, due to the different pre-coding schemes. Within, e.g., region A, signals received in each resource block may advantageously use the same interference profile (once identified) to mitigate the deleterious effect of interfering transmissions from Interferer 1 on received symbols. However, the resource blocks in region B may not utilize the interference profile identified for region A, even though the interference is from the same source, due to the interfering signal in region B having been transmitted using a different pre-coding scheme.

FIG. 1 additionally depicts interference from two other sources—Interferer 2 in region C and Interferer 3 in region D—each utilizing a different pre-coding pattern, but presenting different interference profiles due to different signal strengths, transmission ranks, or the like. Regions C and D are separated by a discontinuity along the time axis. Here again, within each region, multiple resource blocks may advantageously use the same interference profile. However, the resource blocks in region C must use a different interference profile than those in region D, and vice versa. Separating Interferer 1 and Interferers 2 and 3 in frequency is a region of no interference. This region also presents discontinuities in frequency between the regions with and without interference. While FIG. 1 shows the OFDM signal in terms of resource blocks, each resource block itself is comprised of smaller time/frequency tiles called resource elements. Consequently, interferer discontinuities may exist between resource elements within the resource blocks.

Figure 2:
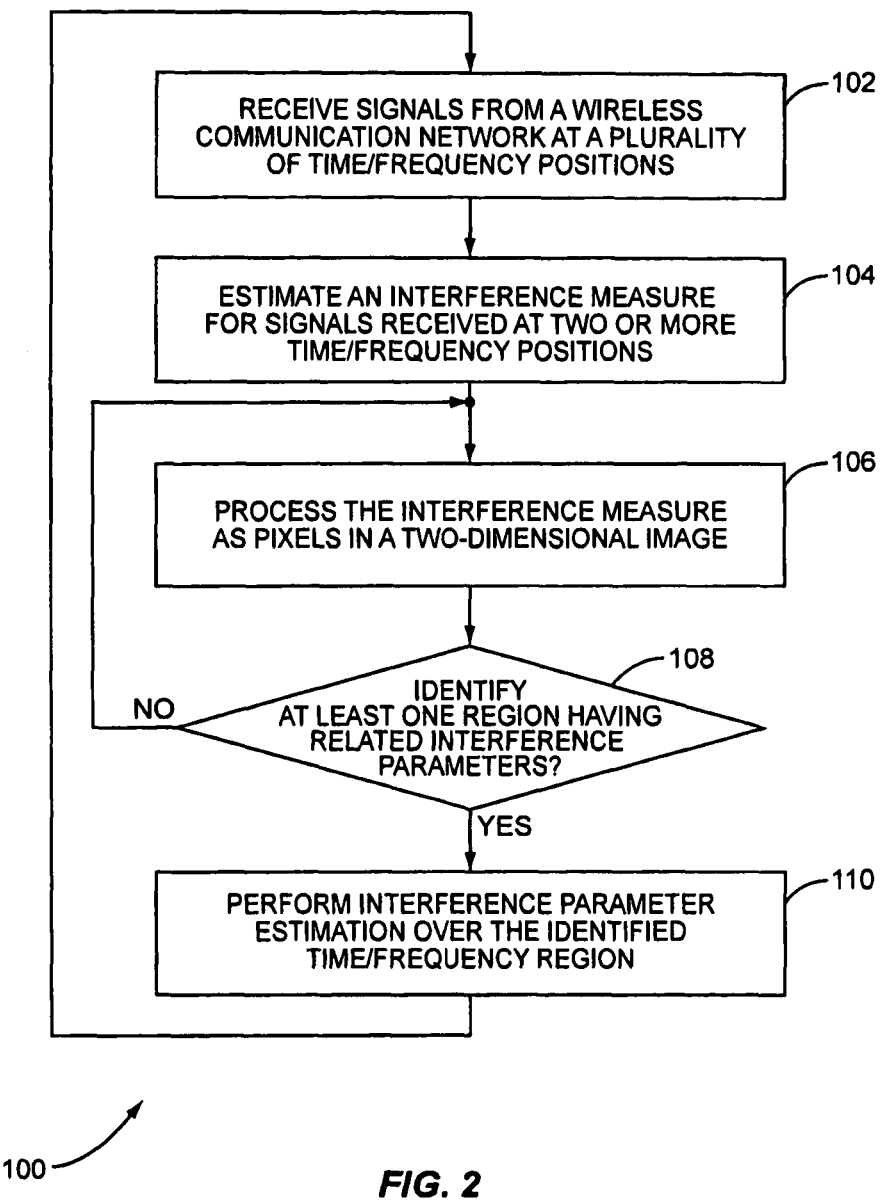
FIG. 2 is a flow diagram of a method of estimating interference presence in an OFDM system.

FIG. 2 depicts the broad outline of a method 100 of estimating interference in an OFDM system. Initially, signals are received from a wireless communication network at a plurality of time-frequency positions (block 102). An interference detection/estimation operation is performed on signals received at two or more time-frequency positions, to generate estimates of an interference measure at the respective positions (block 104). The interference measures are processed as pixels of a two-dimensional image (block 106). In one embodiment, this processing comprises the application of image processing algorithms, including, for example, segmentation, edge detection, and/or clustering. The processing continues until at least one region—that is, at least one contiguous area over signals received at different time-frequency positions—is identified (block 108). Once such a region is identified, interference parameter estimation is performed over all time-frequency positions in the region (block 110).

As one representative example, consider a two-antenna receiver that obtains an error signal (desired signal removed) representing the interference from one interferer, transmitted from two transmit antennas, given by:

$$\begin{bmatrix} e_1 \\ e_2 \end{bmatrix} = \begin{bmatrix} g_{11} & g_{12} \\ g_{21} & g_{22} \end{bmatrix} ps + n \text{ where}$$

$e_1$ and $e_2$ are the errors at the two receive antennas;
$g_{yx}$ is the interferer channel tap from interferer transmit antenna x to receiver antenna y;
p is the pre-coding vector used for the interferer transmission;
s is the transmitted interferer symbol; and
n is the noise vector at the received antennas.

For two-antenna, single-layer transmission in the LTE downlink, for example, the pre-coding vectors can take the following values:

$$p \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}.$$

Thus, forming the impairment covariance estimate $R_e$ from a single OFDM tile under the assumption of pre-coding $p=[1\ 1]^T$ results in the following $$R_e = \begin{bmatrix} |g_{11} + g_{12}|^2 + \sigma_n^2 & (g_{11} + g_{12})(g_{21} + g_{22})* \\ (g_{21} + g_{22})(g_{11} + g_{12})* & |g_{21} + g_{22}|^2 + \sigma_n^2 \end{bmatrix}, \text{ where}$$

$\sigma_n^2$ is the noise variance common to each receive antenna.

In one embodiment, an interference measure is the trace of each impairment covariance—that is, the sum of the diagonal elements of each $R_e$. An impairment covariance is collected for a plurality of the OFDM tiles, or time-frequency positions, and arranged as a two-dimensional image for further processing. The impairment covariance trace, used as an interference measure, under the different pre-coding vectors assumed above would result in the following potential image values $i_{jk}$:

$$i_{jk} = \begin{cases} |g_{11} + g_{12}|^2 + |g_{21} + g_{22}|^2 + 2\sigma_n^2, \\ |g_{11} - g_{12}|^2 + |g_{21} - g_{22}|^2 + 2\sigma_n^2, \\ |g_{11} + jg_{12}|^2 + |g_{21} + jg_{22}|^2 + 2\sigma_n^2, \\ |g_{11} - jg_{12}|^2 + |g_{21} - jg_{22}|^2 + 2\sigma_n^2. \end{cases}$$

The terms jk represent the time and frequency indices for the elements in the two-dimensional image.

Figure 3:
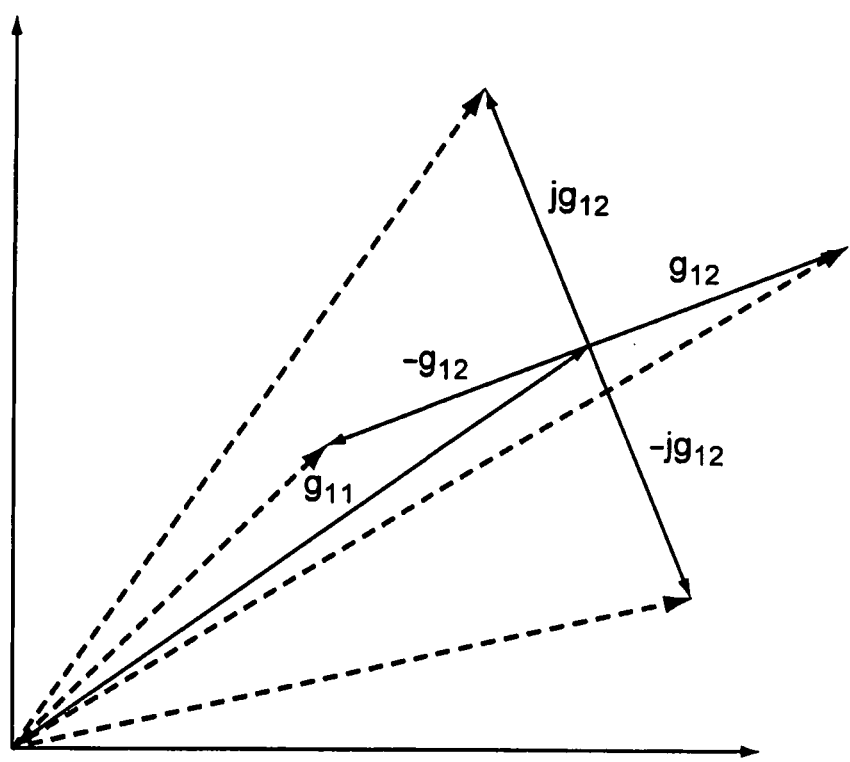
FIG. 3 is a diagram of channel tap values and the effect of the pre-coding for potential image values at a receiver antenna.

To illustrate how these might be used, consider FIG. 3, which depicts the interference measure corresponding to the portion of the above $i_{jk}$ values at one receiver antenna. The solid lines show the channel tap values in vector form, and the dashed lines represent the effect of the pre-coding on the first receive antenna for the two channel taps. The lengths of the dashed lines can be used to determine whether there are interferer discontinuities between adjacent elements in the two-dimensional image. The discontinuities result from abrupt changes in the channel or changes in the pre-coding vector. The image values are then used as input for further two-dimensional processing. As non-limiting example, the image processing operations performed on the two-dimensional array of interference measures may include edge detection, segmentation, and clustering.

Edge detection broadly refers to image processing algorithms that attempt to identify points in an image (or, as here, a two-dimensional array values processed as an image) at which the magnitude of pixels changes sharply, or has discontinuities. Edge detection algorithms may be search-based, in which edges are detected by first computing a measure of edge strength (usually a first-order derivative expression such as the gradient magnitude) and then searching for local directional maxima of the gradient magnitude using a computed estimate of the local orientation of the edge (usually the gradient direction). Other known edge detection algorithms are zero-crossing based, which search for zero crossings in a second-order derivative expression computed from the image in order to find edges (usually the zero-crossings of the Laplacian or of a non-linear differential expression). In either case, a smoothing stage, such as Gaussian smoothing, may be applied as a pre-processing step. A wide variety of edge detection approaches and algorithms are known in the art, and not further explicated herein. Any such algorithms may be advantageously applied to a two-dimensional array of interference measures corresponding to time-frequency positions of received OFDM wireless communication signals, to identify edges of regions of the array having related interference parameters, for performing interference parameter estimation over the identified time-frequency region.

Segmentation broadly refers to image processing algorithms that attempt to partition an image (or, as here, a two-dimensional array values processed as an image) into multiple segments. A number of segmentation algorithms are known in the art, including K-means (K cluster centers are defined, pixels are iteratively assigned to the cluster that minimizes the variance between the pixel and the cluster center, cluster centers are re-computed by averaging all pixels, and the process is repeated to convergence); histogram-based (a histogram is computed from all pixels in an image, and peaks and valleys in the histogram are used to locate clusters); edge detection (discussed above); region growing (seed pixels are chosen, and regions are iteratively grown by adding unallocated neighboring pixels to a region based on the difference between the pixel value and the mean value of the region); graph partitioning (including, e.g., random walker, minimum mean cut, normalized cut, and minimum spanning tree-based algorithms); watershed (the gradient magnitude of an image is considered as a topographic surface, and pixels having the highest gradient magnitude intensities correspond to watershed lines, which represent the region boundaries); and multi-scale segmentation (computing image descriptors at multiple scales of smoothing); and several others. Any such algorithms may be advantageously applied to a two-dimensional array of interference measures corresponding to time-frequency positions of received OFDM wireless communication signals, to identify segments or regions of the array having related interference parameters, for performing interference parameter estimation over the identified time-frequency region.

Edge detection and segmentation operations results in the identification of clusters of the OFDM time-frequency positions associated with similar interference measures. Any known clustering algorithms may be advantageously applied to a two-dimensional array of interference measures corresponding to time-frequency positions of received OFDM wireless communication signals, to identify regions of the array having related interference parameters, which may result from the same interferer parameter profile.

Figure 4:
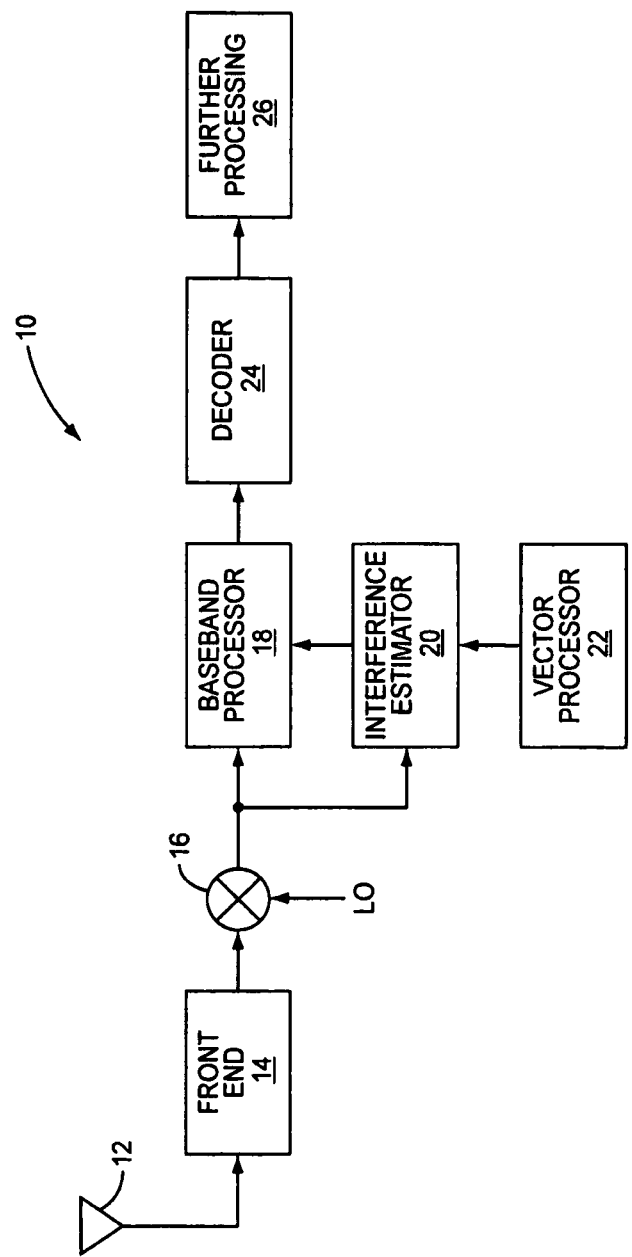
FIG. 4 is a functional block diagram of User Equipment (UE) or a base station including image processing calculations as part of interference estimation.

Many image processing operations are characterized by performing repetitive or iterative calculations over a number of values (such as interference measures corresponding to a plurality of time-frequency positions in an array of OFDM signals), known in the art as vector processing. A variety of dedicated hardware processing technology has been developed to optimize vector processing computational tasks. In one embodiment, as depicted in FIG. 4, a receiver 10 operative in an OFDM wireless communication system includes vector processing hardware 22. The receiver 10 may be located in a UE or a base station.

The receiver 10 receives OFDM signals at an antenna 12, which are processed by a front end processing circuit 14 (including low noise amplification, analog filtering, analog to digital conversion, and the like). The signal is down converted to baseband at mixer 16 by combining it with a signal from a local oscillator (LO), and processed in baseband processing module 18. The baseband processor 18 receives interference presence estimates from interference estimation module 20. In at least one embodiment, the interference estimation module 20 includes, or communicates with, a vector processing circuits 22, which may for example be particularly optimized to perform the image processing operations described herein. The received signal is then decoded at decoder 24, and subjected to further processing by circuits 26. Only the elements of the receiver chain pertinent to this disclosure are depicted in FIG. 4, and other elements of the equipment containing the receiver 10 (e.g., transmitter, user interface, memory, camera, and the like) are omitted for clarity.

After the clustering operation (if utilized), parameter estimation is performed for the interference parameters in a clustered region using either the original received data or the error measurements for the time-frequency positions in the corresponding clusters. As one example, interference rejection combining (IRC) may be performed within a clustered region using the interferer parameters determined within that region. Other demodulation approaches include joint detection and subtractive interference cancellation.

In one embodiment, the error signals, from which the functions of impairment covariances are computed, may be constructed from the time-frequency positions in which reference (pilot) symbols for the desired signal were transmitted. In one embodiment, they may be constructed from data symbols at other time-frequency positions, after the data is decoded and subtracted out, leaving the error signal. Another alternative is to use as the error signal, the detected soft-value measurements from a receiver that does not perform interference cancellation (such as an MRC receiver).

Although the interference measure considered as a pixel value in a two-dimensional array for similar-interference region detection via image processing techniques is described above as the trace of the impairment covariance for each time-frequency position in the array, those of skill in the art will readily recognize, given the teachings of this disclosure, that the interference measure may comprise any of a variety of other quantities as well. For example, in one embodiment, the interference measure comprises the full covariance matrix at each relevant time-frequency position. In yet another example, the interference measure comprises some function of the covariance matrix, such as its determinant, maximum Eigen value, or condition number. In another embodiment, the interference measure comprises the error signal itself. Note that the interference measure may be a simple scalar value, a complex value, a matrix value, a vector value, or, in general, any mathematical quantity that relates to or includes some information about interference in a received OFDM signal at a particular time-frequency position. Furthermore, regular patterns that might exist in the downlink signal may be incorporated into the similar-interference region identification, such as the identification or knowledge of reference OFDM pilot symbols.

Performing interference cancellation in environments where the interference profile varies reduces estimation performance in two ways. First, obtaining accurate estimates of the interferer parameters is limited if only a single resource block is used. Second, interferer parameter estimation is degraded when the interference changes abruptly over the estimation region. By identifying the regions where the interferer parameters are similar, more accurate interferer parameter estimates can be formed using data matched to the interferer region. This will improve data detection in the varying interference environment. Additionally, CQI estimation and link adaptation will be less sensitive to the changing interference environment.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating interference present in an Orthogonal Frequency Division Multiplexing wireless communication system, comprising:
    receiving signals from a wireless communication network at a plurality of time-frequency positions;
    estimating an interference measure for signals received at each of two or more time-frequency positions;
    performing at least one image processing operation to process the estimated interference measures as pixels in a two-dimensional image; and
    identifying, in response to the image processing operation, at least one region in the time-frequency space having related interference parameters.

2. The method of claim 1, further comprising performing interference parameter estimation over the identified time-frequency region.

3. The method of claim 1, further comprising performing interference rejection combining of data extracted from signals received within an identified time-frequency region having related interference parameters.

4. The method of claim 1, wherein the one or more image processing operations comprises segmentation.

5. The method of claim 1, wherein the one or more image processing operations comprises edge detection.

6. The method of claim 1, wherein the one or more image processing operations comprises clustering.

7. The method of claim 1, wherein the interference measure comprises an impairment covariance matrix associated with signal received at a time-frequency position.

8. The method of claim 7, wherein the interference measure comprises a trace of the impairment covariance matrix.

9. The method of claim 1, wherein the interference measure comprises an error signal computed from a signal received at a time-frequency position.

10. The method of claim 1, wherein the interference measure comprises soft-value metrics from a Maximum Ratio Combining receiver.

11. User Equipment (UE) operative to receive Orthogonal Frequency Division Multiplexing signals at a plurality of time-frequency positions, comprising:
    one or more antennas;
    a front-end receiver circuit connected to the one or more antennas and operative to process received signals;
    an interference estimator operative to estimate an interference measure for signals received at each of two or more time-frequency positions; and
    an image processor operative to perform at least one image processing operation on the estimated interference measures as pixels in a two-dimensional image to identify at least one region in the time-frequency space having related interference parameters.

12. The UE of claim 11, wherein the interference estimator is further operative to perform interference parameter estimation over the identified time-frequency region.

13. The UE of claim 11, wherein the image processor comprises a vector processing circuit.

14. A base station operative to receive Orthogonal Frequency Division Multiplexing signals at a plurality of time-frequency positions, comprising:
    one or more antennas;
    a front-end receiver circuit connected to the one or more antennas and operative to process received signals;
    an interference estimator operative to estimate an interference measure for signals received at each of two or more time-frequency positions; and
    an image processor operative to perform at least one image processing operation on the estimated interference measures as pixels in a two-dimensional image to identify at least one region in the time-frequency space having related interference parameters.

15. The base station of claim 14, wherein the interference estimator is further operative to perform interference parameter estimation over the identified time-frequency region.

16. The base station of claim 14, wherein the image processor comprises a vector processing circuit.

* * * * *